UNITED STATES PATENT OFFICE.

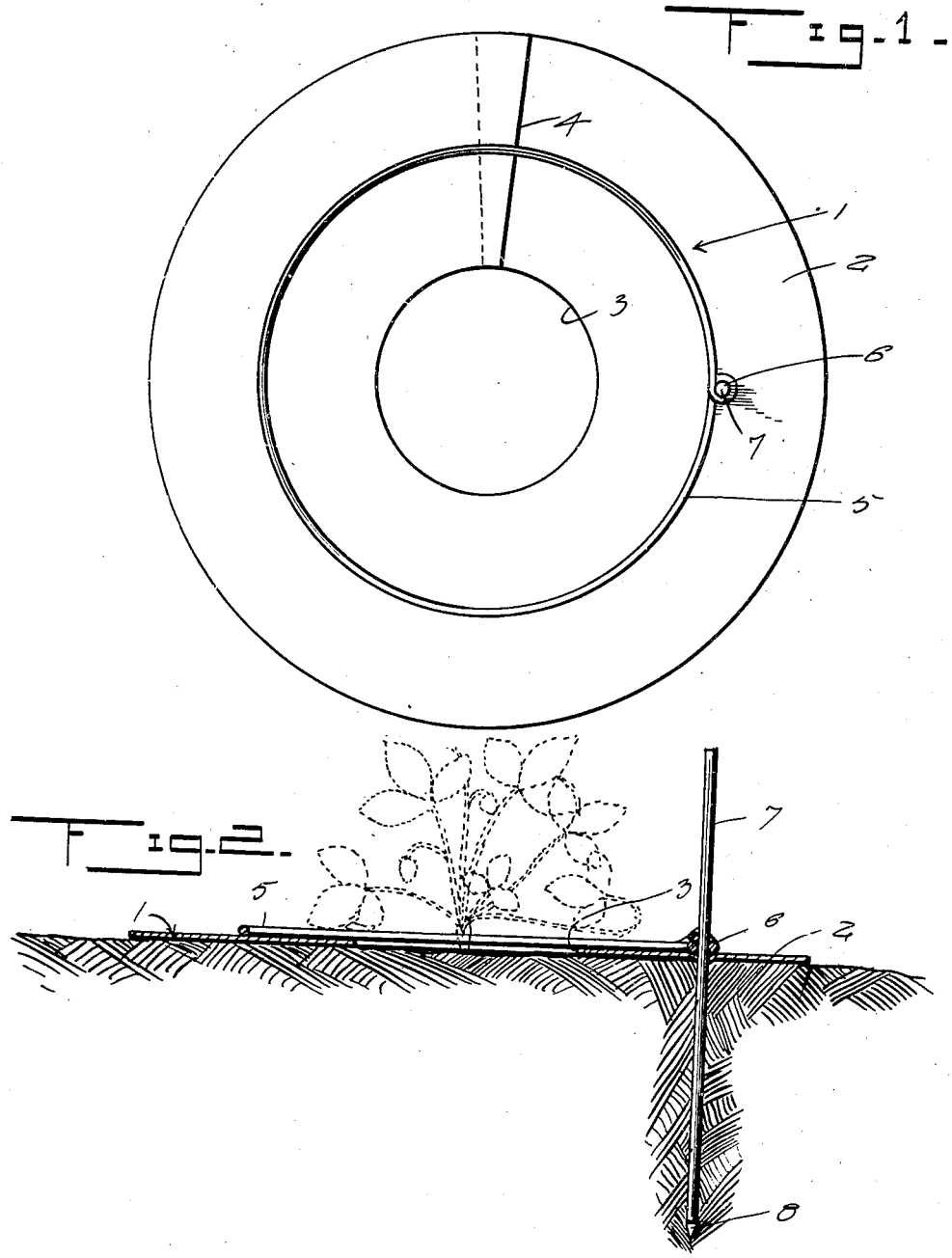

EDWARD A. HAMMOND, OF BURBANK, SOUTH DAKOTA.

STRAWBERRY-PLANT SUPPORT.

1,319,769.

Specification of Letters Patent.  Patented Oct. 28, 1919.

Application filed June 4, 1918. Serial No. 238,166.

*To all whom it may concern:*

Be it known that I, EDWARD ADELBERT HAMMOND, a citizen of the United States, residing at Burbank, in the county of Clay and State of South Dakota, have invented certain new and useful Improvements in Strawberry-Plant Supports; and I do hereby declare the following to be a full, clear, and exact description of the invention, such as will enable others skilled in the art to which it appertains to make and use the same.

This invention relates to strawberry plant protectors and the primary object of the invention is to provide an improved protector, which will effectively prevent the evaporation of the moisture from the soil, and will eliminate the use of straw ordinarily used for this purpose.

Another object of the invention is to provide an improved strawberry plant protector which can be readily and easily applied to the plant and one in which the displacement thereof is impossible.

A further object of the invention is to provide an improved strawberry plant mulcher, which includes an annular section of waxed or oiled paper, which is arranged to be placed around the plant and having means for engaging the paper to prevent accidental displacement thereof.

A still further object of the invention is to provide an improved plant protector of the above character, which is durable and efficient in use, one that is simple and easy to manufacture and one that can be placed upon the market at a reasonable cost.

With these and other objects in view the invention consists in the novel construction, arrangement and formation of parts, as will be hereinafter more specifically described, claimed and illustrated in the accompanying drawing, forming a part thereof in which:

Figure 1 is a plan view of the improved strawberry plant mulcher,

Fig. 2 is a vertical section through the same, showing the same around a plant.

Referring to the drawings in detail, wherein similar reference characters designate corresponding parts throughout the several view, the numeral 1 generally indicates the improved plant protector, which includes the circular sheet of paper 2 having a concentric opening 3, which the strawberry plant is arranged to protrude through. The circular paper 2 is slit radially from the opening 3 to the outer edge thereof as at 4, which allows the same to be readily slipped around the plant and to be adjusted according to the size of the plant. It can be seen that when it is desired to adjust the paper 2 around the roots of the plant the terminals of the same are overlapped, as clearly shown in Fig. 1. The paper is preferably oiled or waxed, so that the same will withstand the elements and is adapted to fit close against the ground so as to effectively prevent the evaporation from the ground and at the same time allow the plant to catch a large amount of rain.

To hold the sheet of the paper 2 in correct position, a wire hoop 5 is provided, which is coiled intermediate its ends to provide an eye 6 in which is adapted to frictionally seat a stake 7, which has its lower end sharpened as at 8 for insertion into the ground. In use of the improved device, the paper protector 2 is applied to the plant in the manner described above and the wire hoop 5 is then laid on the same, and the stake 7 is driven in the eye 6 and into the ground which holds the hoop in position and effectively prevents the riding up of the protector 2 and prevents displacement thereof.

From the foregoing description it can be seen that an improved strawberry plant mulcher is provided, which will fit close up against the ground and prevent evaporation of the soil and at the same time allow the plant to catch a large amount of rain, the mulcher being so constructed that displacement thereof is absolutely prevented.

In practice, I have found that the form of my invention, illustrated in the accompanying drawings and referred to in the above description, as the preferred embodiment, is the most efficient and practical; yet realizing the conditions concurrent with the adoption my device will necessarily vary, I desire to emphasize the fact that various minor changes in details of construction, proportion and arrangement of parts may be resorted to, when required, without sacrificing any of the advantages of my invention as set forth.

What I claim as new is:

A strawberry plant protector comprising a flat annular waterproof plate arranged to encircle the plants and to engage the soil around the same, an annular wire hoop arranged to engage the upper surface of the plate intermediate its inner and outer edges, said hoop having an outwardly extending eye formed therein, a stake arranged to extend through the eye and plate and into the ground to hold the plate to prevent displacement of the plate, as and for the purpose specified.

In testimony whereof I affix my signature in presence of two witnesses.

EDWARD A. HAMMOND.

Witnesses:
R. H. OAKLEY,
HARRY F. HESS.

Copies of this patent may be obtained for five cents each, by addressing the "Commissioner of Patents, Washington, D. C."